US011187544B2

(12) United States Patent
Sherman et al.

(10) Patent No.: US 11,187,544 B2
(45) Date of Patent: Nov. 30, 2021

(54) DETERMINING AND DISPATCHING A RIDE-SHARE VEHICLE

(71) Applicant: EBAY INC., San Jose, CA (US)

(72) Inventors: Corinne E. Sherman, San Jose, CA (US); Dane Glasgow, San Jose, CA (US); David Ramadge, Los Altos, CA (US)

(73) Assignee: eBay Inc., San Jose, CA (US)

( * ) Notice: Subject to any disclaimer, the term of this patent is extended or adjusted under 35 U.S.C. 154(b) by 515 days.

(21) Appl. No.: 14/586,703

(22) Filed: Dec. 30, 2014

(65) Prior Publication Data

US 2016/0187150 A1 Jun. 30, 2016

(51) Int. Cl.
*G01C 21/34* (2006.01)
*G06Q 10/06* (2012.01)
*H04W 4/021* (2018.01)
*G06Q 10/02* (2012.01)

(52) U.S. Cl.
CPC ......... *G01C 21/3438* (2013.01); *G06Q 10/02* (2013.01); *G06Q 10/063114* (2013.01); *H04W 4/021* (2013.01)

(58) Field of Classification Search
None
See application file for complete search history.

(56) References Cited

U.S. PATENT DOCUMENTS

| | | | |
|---|---|---|---|
| 5,726,885 A | 3/1998 | Klein et al. | |
| 6,636,145 B1 | 10/2003 | Murakami et al. | |
| 2006/0241983 A1* | 10/2006 | Viale | G06F 21/6245 705/5 |
| 2008/0195428 A1* | 8/2008 | O'Sullivan | G06Q 10/063112 705/6 |
| 2011/0054956 A1* | 3/2011 | Meyer | G06Q 50/14 705/5 |
| 2012/0078672 A1* | 3/2012 | Mohebbi | G06Q 10/0631 705/7.12 |
| 2012/0290652 A1* | 11/2012 | Boskovic | G06Q 50/30 709/204 |
| 2014/0172727 A1* | 6/2014 | Abhyanker | G06Q 50/30 705/307 |
| 2015/0323331 A1* | 11/2015 | Lord | G01C 21/3423 701/410 |

(Continued)

FOREIGN PATENT DOCUMENTS

| | | | | |
|---|---|---|---|---|
| CN | 103050003 A | * | 4/2013 | ........... G06Q 10/047 |
| EP | 1172768 A2 | | 1/2002 | |

OTHER PUBLICATIONS

Amrinder Arora, Automated Ride Share Selection using Vehicular Area Networks, 2009, IEEE International Conference on Communications Workshops (pp. 1-6) (Year: 2009).*

(Continued)

*Primary Examiner* — Jerry O'Connor
*Assistant Examiner* — Matthew H Divelbiss
(74) *Attorney, Agent, or Firm* — FIG. 1 Patents (57) ABSTRACT

A method may include determining a transportation situation of a person. The method may also include selecting, based on the transportation situation, a particular ride-share vehicle from a plurality of ride-share vehicles for use by the person with respect to the transportation situation. The particular ride-share vehicle may be of a particular vehicle type based on the transportation situation.

20 Claims, 3 Drawing Sheets

(56) References Cited

U.S. PATENT DOCUMENTS

2016/0055743 A1* 2/2016 Raj ..................... B60L 53/65
                                                    701/22
2016/0125735 A1* 5/2016 Tuukkanen ............ G08G 1/202
                                                    701/23

OTHER PUBLICATIONS

Kastrenakes, "Google Fine Tunes its Self-Driving Car for City Streets", Retrieved from the Internet URL : <http://www.theverge.com/2014/4/28/5660776/google-self-driving-car-city-testing-improvements>, Apr. 28, 2014, 2 pages.

Ziegler, "The Batmobile is Real: Audi's Self-Driving Car Picks you up on Command", Retrieved from the Internet URL: <http://www.theverge.eom/2013/1/9/3853738/audi-self-driving-car-ces-2013>, Jan. 9, 2013, 3 pages.

* cited by examiner

DETERMINING AND DISPATCHING A RIDE-SHARE VEHICLE

FIELD

The embodiments discussed herein are related to determining a ride-share vehicle and dispatching the determined vehicle type.

BRIEF DESCRIPTION OF THE DRAWINGS

Example embodiments will be described and explained with additional specificity and detail through the use of the accompanying drawings in which.

DESCRIPTION OF EMBODIMENTS

Different types of vehicles may be suited for different uses or scenarios. For example, a four wheel drive vehicle may be better suited for snowy or off-road type use than a two-wheel drive vehicle. As another example, larger vehicles or vehicles with a relatively large amount of cargo space may be better suited for transporting relatively large objects or a relatively large number of objects or people. As yet another example, smaller vehicles may be better suited for city driving than larger vehicles. Moreover, certain types of vehicles may be used more than other types of vehicles in certain cities or certain types of vehicles may be better suited for attendance to certain events than others.

Therefore, according to at least one embodiment described herein, a ride-share system may be implemented such that a person may have access to different ride-share vehicles of different vehicle types depending on a transportation situation of the person. Additionally, a particular ride-share vehicle may be determined for the person based on the transportation situation. Moreover, the particular ride-share vehicle may be dispatched to a location of the person such that the person may not need to travel to the particular ride-share vehicle in order to use the particular ride-share vehicle.

Figure 1:
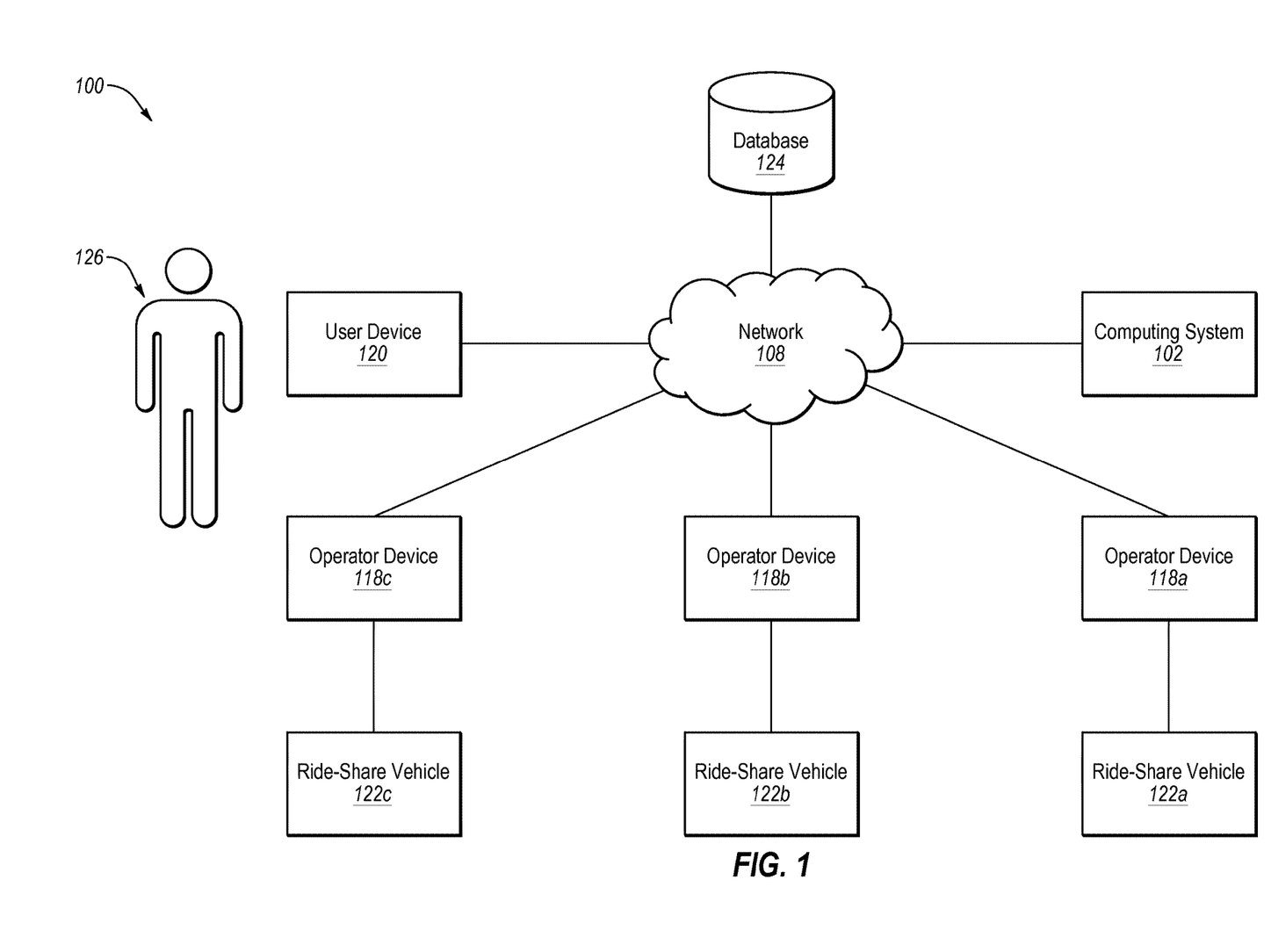
FIG. 1 illustrates an example ride-share system that may implement a ride-share program.

Turning to the figures, FIG. 1 illustrates an example ride-share system 100 (referred to hereinafter as "system 100") that may implement a ride-share program, according to at least one embodiment described herein. The system 100 may include a computing system 102, one or more user devices 120, a network 108, a database 124, one or more operator devices 118 and one or more ride-share vehicles 122 that may each correspond to an operator device 118. In the illustrated embodiment, the system 100 is depicted as including an operator device 118a with a corresponding ride-share vehicle 122a, an operator device 118b with a corresponding ride-share vehicle 122b, and an operator device 118c with a corresponding ride-share vehicle 122c. Further, the system 100 is depicted and described with respect to a person 126 and the user device 120. However, it is understood that the system 100 may include any number of user devices 120, operator devices 118, or ride-share vehicles 122. The number of elements described and illustrated is merely given as an example.

The ride-share vehicles 122 may include any type of vehicle that may be relatively well suited for different transportation situations. For example the ride-share vehicle 122a may include a vehicle relatively well suited for city-based driving and may include a compact car, a hybrid vehicle, an electric vehicle, etc. As another example, the ride-share vehicle 122b may include a vehicle relatively well suited for inclement weather or slick conditions and may include a four-wheel drive vehicle. As another example, the ride-share vehicle 122c may include a vehicle relatively well suited for transporting a relatively large number of people or objects and may include a full-sized sport utility vehicle (SUV), a van, etc. Other examples of ride-share vehicles 122 may include luxury vehicles that may be relatively well suited for special occasions or upscale areas; economy vehicles that may be relatively well suited for higher risk areas with respect to vehicles, pickup trucks for increased storage needs or cargo needs, a relatively common type of vehicle that may be used in a particular city that may be used for blending in, etc.

In general, the system 100 may be configured such that persons (e.g., the person 126) may have access to different ride-share vehicles depending on their planned transportation situations. The system 100 may be configured such that a particular ride-share vehicle 122 may be determined for a particular transportation situation and may also be dispatched to a particular location for a person to pick up and use. The system 100 may allow for more flexibility in satisfying transportation desires and needs than other systems (e.g., car rentals, taxis, personal vehicle use, etc.) by adapting to the transportation needs or desires of the persons in a much more customized and dynamic manner than currently offered.

For example, while on vacation, the person 126 may access and use the system 100 to use different ride-share vehicles 122 of different types at different times according to the planned destinations or activities of the person 126. As another example, the person 126 may use the system 100 for commuting, attending certain events, dining at certain restaurants, etc.

One or more elements of the system 100 may communicate with each other via the network 108. The network 108 may include any interconnecting system capable of transmitting audio, video, signals, data, messages, or any combination of the preceding. For example, the network 108 may include all or a portion of a public switched telephone network (PSTN); a public or private data network; a local area network (LAN); a metropolitan area network (MAN); a wide area network (WAN) (e.g., the Internet), or other interconnected data paths across which multiple devices and/or entities may communicate. In some implementations, the network 108 may include a peer-to-peer network. The network 108 may also be coupled to or may include portions of a telecommunications network for sending data in a variety of different communication protocols.

In some embodiments, the network 108 may include Bluetooth® communication networks or a cellular communications network for sending and receiving communications and/or data including via short message service (SMS), multimedia messaging service (MMS), hypertext transfer protocol (HTTP), direct data connection, wireless application protocol (WAP), e-mail, etc. The network 108 may also include a mobile data network that may include third-generation (3G), fourth-generation (4G), long-term evolution (LTE), long-term evolution advanced (LTE-A), Voice-over-LTE ("VoLTE") or any other mobile data network or combination of mobile data networks. Further, the network 108 may include one or more IEEE 802.11 wireless networks.

The user device 120 may include any suitable system, apparatus, or device that may be used to indicate a location or future location of the person 126. For example, the user device 120 may include a portable electronic device (e.g., a smartphone) of the person 126 that may track its location via a global positioning system (GPS) signal, a cellular service signal, etc. Additionally or alternatively, the user device 120 may include a personal vehicle of the person 126 that may also include a GPS system such that the location of the personal vehicle may be determined. In these or other embodiments, the user device 120 may include a tablet computer whose location may also be tracked via a GPS signal and/or a mobile data network signal.

Further, in some embodiments, the user device 120 may include any suitable electronic device where the person 126 may enter an itinerary or a calendar entry that may indicate a planned location of the person 126. In some embodiments, the itinerary or calendar may be stored in the database 124. Additionally or alternatively, the person 126 may use the user device 120 to make reservations, purchase tickets, etc. and such purchases may also be stored in the database 124.

The database 124 may include computer-readable storage media configured to store data. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media.

In some embodiments, the database 124 may be configured to store information related to the person 126 that may be used for determining transportations situations of the person 126. For example, the database 124 may store information such as a location history of the user device 120, a calendar of the person 126, one or more itineraries of the person 126, reservations made by the person 126, ticket purchases made by the person 126, etc.

Additionally or alternatively, the database 124 may be configured to store information related to an area where the system 100 may be implemented. For example, the database 124 may store weather information about a particular area, climate information about the particular area, terrain about the particular area, vehicular use within the particular area, etc.

Although illustrated as a single database 124 in the illustrated example, the database 124 may include any number of databases that may or may not be associated with each other. For example, the database 124 may include a first database that may include information about the person 126 stored thereon and the database 124 may include a separate, unrelated second database that may include information about one or more areas stored thereon.

The computing system 102 may include any suitable system, apparatus, or device configured to determine an inventory of ride-share vehicles 122 or selecting and dispatching of the ride-share vehicles 122. An example of the computing system 102 is described below with respect to a computing system 202 in FIG. 2.

In some embodiments, the computing system 102 may be configured to determine an inventory of ride-share vehicles 122 for a particular area. In these or other embodiments, the computing system 102 may be configured to determine the inventory based on area information that may include types of vehicles used within the particular area, common driving situations within the particular area, climate of the particular area, terrain of the particular area, typical use of the ride-share vehicles 122, a demand potential for the ride-share vehicles 122, etc. In some embodiments, one or more elements included in the area information may be stored in the database 124 and the computing system 102 may access the database 124 via the network 108 to retrieve the area information.

As an example of determining inventory, a first area may have a climate that may receive little to no snowfall or other inclement weather where four-wheel drive may not be useful. As such, the computing system 102 may determine an inventory for the first area where the number of four-wheel drive ride-share vehicles 122 may be relatively small. In contrast, a second area may be a mountainous and relatively snowy area such that the computing system 102 may determine an inventory that includes a larger number of four-wheel drive vehicles.

Additionally or alternatively, the computing system 102 may be configured to adjust the inventory based on the time of year. For example, the second area may get snow mainly in the late fall, winter, and early spring such that the inventory of four-wheel drive ride-share vehicles 122 may be increased during that time of year as opposed to during late spring, summer, and early fall.

As another example of inventory determination, the computing system 102 may analyze the types of vehicles used in a particular area and may determine the inventory of ride-share vehicles 122 to match the distribution of vehicle types in the respective areas. Assume, for example, that approximately 60% of vehicles in the particular area are of a first type, approximately 20% of vehicles in the particular area are of a second type, approximately 10% of vehicles in the particular area are of a third type, and approximately 10% of vehicles in the particular area are of a fourth type. The computing system 102 may determine an inventory for the particular area where approximately 60% of the ride-share vehicles 122 are of the first type, approximately 20% of the ride-share vehicles 122 are of the second type, approximately 10% of the ride-share vehicles 122 are of the third type, and approximately 10% of the ride-share vehicles 122 are of the fourth type. In these or other embodiments, the computing system 102 may also select the makes and models of the ride-share vehicles 122 that may be included in the inventory based on relatively common makes and models of vehicles used in the particular area.

As another example of inventory determination, the roads of the first area indicated above may be relatively narrow or parking may be relatively tight as compared to the second area. As such, the computing system 102 may determine a first inventory for the first area that may include a larger number of smaller ride-share vehicles 122 than a second inventory for the second area.

As another example of inventory determination, in some embodiments, the computing system 102 may be configured to determine a demand potential for the ride-share vehicles 122 to determine how many ride-share vehicles 122 may be included in the inventory. For example, the computing system 102 may analyze how many people may enter and leave a city via public transportation on a given day. Those people may want a vehicle for transportation within the city while there such that the computing system 102 may determine a percentage of persons who use public transportation who may also desire to use a ride-share vehicle 122 during the day.

Additionally or alternatively, the demand potential may also be determined based on other transportation services that may be used in the particular area. For example, the demand potential may be based on how many taxis, limos, lyft drivers, uber drivers, etc. may be in the particular area. Further, the frequency and/or type (e.g., short or long trips, destination locations, departure locations, etc.) of use of the other transportation services may also indicate the demand potential for use of ride-share vehicles 122.

In these or other embodiments, traffic patterns may also be used to determine the demand potential. For example, a number of vehicles that may be on the roadways of the area, how many of the vehicles use high occupancy vehicle (HOV) lanes, areas where people commute from and to, etc. may also be used to determine the demand potential for use of the ride-share vehicles 122 by indicating how many people (e.g., carpoolers, longer distance commuters, etc.) may have an interest in using the ride-share vehicles 122.

In these or other embodiments, the computing system 102 may be configured to modify inventory of the ride-share vehicles 122 according to usage patterns of users of ride-share vehicles 122. For example, the usage patterns may indicate that a certain type of ride-share vehicle 122 is in more demand than other types of ride-share vehicles such that the computing system 102 may determine that the inventory may be increased with more ride-share vehicles 122 of the type that is in relatively high demand.

In some embodiments, one or more users (e.g., the person 126) of the ride-share vehicles 122 may opt to include their own vehicles in the inventory of ride-share vehicles 122. As such, the computing system 102 may also analyze which persons have opted to include their vehicles in the inventory and may include the corresponding vehicles in the inventory. In these or other embodiments, persons who opt to have their vehicles included as ride-share vehicles may designate types of uses that may be allowed for their vehicles and/or specific times that their vehicles may be available. Additionally or alternatively, persons who decide to include their vehicles in the inventory of ride-share vehicles may receive a benefit or compensation for opting-in, which may increase an opt-in rate.

In some embodiments, one or more of the ride-share vehicles 122 may be self-driving in which an operator of a self-driving ride-share vehicle 122 may include an electrical and mechanical system that may not require a human. The self-driving ride-share vehicles 122 may include any suitable system, apparatus, or device that may be configured to enable the self-driving nature.

In some embodiments, the computing system 102 may be configured to determine a particular ride-share vehicle 122 for use by the person 126 based on a particular transportation situation of the person 126. In these or other embodiments, the computing system 102 may be configured to determine the particular transportation situation based on one or more factors that may include weather, a planned destination, a planned area of travel, number of occupants, an amount of cargo, an itinerary, a planned event, a calendar of the person 126, gas prices, traffic patterns, road types (e.g., paved, unpaved, highway, freeway, etc.), road conditions (e.g., well lit, dim, newly paved, in disrepair, potentially slick, potential standing water, etc.) and so forth.

For example, the computing system 102 may be configured to receive an itinerary of the person 126 that may indicate travel plans of the person 126. Assume for example that the travel plans indicate that the person 126 plans to be within a city (e.g., San Francisco) on a first day of a trip and also plans to travel to a country area outside of the city (e.g., Napa Valley) on a second day of the trip. The computing system 102 may determine a ride-share vehicle 122 that is relatively well suited for city driving for the first day and may determine a different ride-share vehicle 122 that is relatively well suited for longer distance or country traveling for the second day.

Additionally or alternatively, the computing system 102 may be configured to analyze the weather for the days included in the itinerary and may determine the ride-share vehicles 122 according to the weather. For example, the computing system 102 may determine a convertible for a sunny day but not for a rainy day. As another example, the computing system 102 may determine a four-wheel drive vehicle for a potentially snowy day.

As another example, the itinerary may include an upscale restaurant such that the computing system 102 may determine a luxury car for travel to the upscale restaurant. In contrast, in other instances, the itinerary may include a planned destination that may be within or that may require traveling through a relatively unsafe area of a city. The computing system 102 may determine a ride-share vehicle 122a that may be less conspicuous than others for such areas. Additionally or alternatively, the computing system 102 may analyze crime statistics for areas that may be included in planned destinations and may avoid determining ride-share vehicles 122 of types that may be associated with a relatively high amount of theft as compared to other types of vehicles.

As another example, the itinerary of the person 126 may include travel to a particular city with a relatively common vehicle type. The computing system 102 may determine a particular ride-share vehicle 122 of a particular type that may be similar to the relatively common vehicle type of the particular city. As such, the person 126 may appear more as a local than an outsider.

Although the above examples describe the computing system 102 determining planned destinations, travel areas, travel dates, times, etc. based on an itinerary, the computing system 102 may determine such factors via any suitable method. For example, one or more of such factors may be determined from a calendar of the person 126, reservation information of the person 126, ticket purchase information of the person 126, explicit indication by the person 126, etc.

In some embodiments, the computing system 102 may be configured to determine the ride-share vehicle 122 based on one or more inputs by the person 126. The inputs may include preferences of vehicle types, number of planned occupants, a target amount of cargo space, planned cargo, personal driving habits, driving history, vehicle preferences, etc. In some embodiments, the person 126 may have different inputs for different situations or days. For example, travel from an airport to a hotel may require more cargo space than travel around town once luggage has been dropped off at the hotel. The person 126 may indicate different cargo capacities as different inputs according to different transportation situations. The computing system 102 may also determine different ride-share vehicles 122 for the different transportation situations.

As another example, the person 126 may indicate enjoying driving at faster speeds but may also indicate a relatively high incidence in speeding violations via the driving history. The computing system 102 may in some embodiments thus determine a ride-share vehicle 122 that may provide the sensation of driving fast at relatively slower speeds such that the person 126 may enjoy the driving experience while also reducing a likelihood of receiving a speeding violation.

In some embodiments, the computing system 102 may be configured to communicate the ride-share vehicle selection to the user device 120 to inform the person 126 of the determination of the ride-share vehicle 122. In some embodiments, the person 126 may confirm the determined ride-share vehicle 122 as a selection for the transportation situation or the computing system 102 may automatically select the determined ride-share vehicle 122 without confirmation from the person 126.

Additionally or alternatively, the computing system 102 may communicate a list of multiple determined ride-share vehicles 122 that may be used by the person 126. The person 126 may select one of the determined ride-share vehicles 122 from the list. In these or other embodiments, a list of all available ride-share vehicles 122 may also be communicated to the person 126 (e.g., via the user device 120) such that the person 126 may select any one of the available ride-share vehicles 122 in situations where one of the ride-share vehicles 122 determined by the computing system 102 for the transportation situation may not be satisfactory to the person 126.

In these or other embodiments, the computing system 102 may be configured to determine a particular ride-share vehicle for the person 126 based on a usage pattern of the person 126. For example, the database 124 may include ride-share vehicle usage information ("usage information") about the person 126. The usage information may indicate that the person 126 may consistently reject a particular type of ride-share vehicle 122 or may consistently select a particular type of ride-share vehicle 122 with respect to particular transportation situations. The computing system 102 may consider the prior selections of ride-share vehicles 122 in a current determination of a ride-share vehicle 122.

In some embodiments, the computing system 102 may be configured to determine a time and a place for a selected ride-share vehicle 122 to be at a location for use by the person 126. The computing system 102 may be configured to dispatch the selected ride-share vehicle 122 such that it may be at the location at the determined time and place. In some embodiments, the computing system 102 may dispatch the selected ride-share vehicle 122 in response to a confirmation by the person 126. In these or other embodiments, the computing system 102 may automatically dispatch the selected ride-share vehicle 122 without receiving a confirmation from the person 126.

As an example of dispatching operations, the computing system 102 may be configured to determine the time and place for the ride-share vehicle 122 to be at the location based on location information of the person 126. In these or other embodiments, the computing system 102 may be configured to receive the location information from the user device 120 and/or from the itinerary or calendar that may be stored on the database 124. The computing system 102 may be configured to dispatch a ride-share vehicle 122 to the determined location such that it may reach the determined location prior to or at the determined time.

For example, in some embodiments, the person 126 may enter, via the user device 120, a time and place for pick-up of a ride-share vehicle 122. The user device 120 may communicate the information to the computing system 102 and the computing system 102 may dispatch a selected ride-share vehicle 122 to the designated location at the designated time.

As another example of dispatching operations, in some embodiments, the computing system 102 may be configured to periodically receive, from the user device 120, the current location of the user device 120 such that the computing system 102 may track the location of the user device 120. In some embodiments, the location of the user device 120 may indicate that the user device 120 is at a location that may be a designated pick-up location of persons by ride-share vehicles 122. Therefore, the computing system 102 may be configured to determine that the person 126 may want to use a ride-share vehicle 122 when the location information indicates that the user device 120 is at a designated pick up location. The computing system 102 may dispatch a selected ride-share vehicle 122 to the designated pick-up location.

As another example of dispatching operations, in some embodiments, the computing system 102 may be configured to save and track location and travel patterns of the user device 120 as well as usage patterns of the ride-share vehicles 122 by the person 126. The usage, location, and travel patterns may indicate times and locations where the person 126 may commonly use a ride-share vehicle 122. For instance, the location and travel patterns may indicate that the person 126 leaves in a ride-share vehicle 122 from a first particular location to a second particular location most weekdays at a first time. The usage, location, and travel patterns may also indicate that the person 126 leaves in a ride-share vehicle 122 from the second particular location back to the first location at a second time on most weekdays. The computing system 102 may be configured to dispatch a selected ride-share vehicle 122 to the first location at the first time and to dispatch a selected ride-share vehicle 122 to the second location at the second time.

Additionally or alternatively, the usage, location, and travel patterns may indicate that when the person 126 takes particular route, the person 126 typically stops at a particular location and uses a ride-share vehicle 122. The computing system 102 may be configured to dispatch a selected ride-share vehicle 122 to the particular location when the person 126 is currently along a trajectory that includes the particular route.

As another example of dispatching operations, the computing system 102 may have access to a calendar or itinerary of the person 126. The computing system 102 may determine planned locations and destinations of the person 126 at certain times based on the calendar or itinerary and may dispatch a selected ride-share vehicle 122 according to the times and places that may be included in the calendar or itinerary.

Additionally or alternatively, the computing system 102 may use current location information (e.g., received from the user device 120) of the person 126 to determine a time to reach the planned destination by the person 126 and/or to determine a time to reach the current location of the person 126 by the dispatched ride-share vehicle 122. The computing system 102 may use such information to determine when to dispatch the selected ride-share vehicle 122 to the location of the person 126 such that the person 126 may reach the planned destination at the planned time via use of the dispatched ride-share vehicle 122.

In some embodiments, one or more of the ride-share vehicles 122 may be configured as self-driving vehicles. Therefore, when the computing system 102 dispatches a self-driving ride-share vehicle 122 to a particular location, the self-driving ride-share vehicle 122 may drive itself to the particular location without a human driver. Therefore, the self-driving ride-share vehicle 122 may be provided to the person 126 at a particular location while also allowing for the person 126 to use the self-driving ride-share vehicle 122 without the assistance of a driver.

In some embodiments, the computing system 102 may be configured to dispatch the ride-share vehicles 122 via notifications or commands that may be transmitted to the operator devices 118, which may each correspond to a ride-share vehicle 122 as indicated above. The operator devices 118 may include any suitable system, apparatus, or device that may be configured to notify an operator of a ride-share vehicle 122 of a time and location to pick up a person. The operator devices 118 may be included as a part or portion of their corresponding ride-share vehicle 122. Additionally or alternatively, an operator device 118 may include an electronic device (e.g., smartphone, tablet, etc.) of a human operator of its corresponding ride-share vehicle 122. Additionally or alternatively, an operator device 118 of a self-driving ride-share vehicle 122 may include a navigation and/or computing system that may be used by the self-driving ride-share vehicle 122 for determining a route to a particular destination.

In some embodiments, the operator devices 118 may include GPS or other systems that may be used to determine or indicate the locations of the operator devices 118. In these or other embodiments, the operator devices 118 may be configured to communicate corresponding location information to the computing system 102 such that the computing system 102 may be able to track and determine the locations of the corresponding ride-share vehicles 122. The computing system 102 may use the locations of the ride-share vehicles 122 in determining dispatching of the ride-share vehicles 122.

Modifications, additions, or omissions may be made to the system 100 without departing from the scope of the present disclosure. For example, the operations described as being performed by specific elements of the system 100 may be performed by one or more different elements of the system 100. Further, one or more of the operations may be performed in a distributed manner across one or more of the elements. In addition, the system 100 may include more or fewer elements than those explicitly listed or described.

Figure 2:
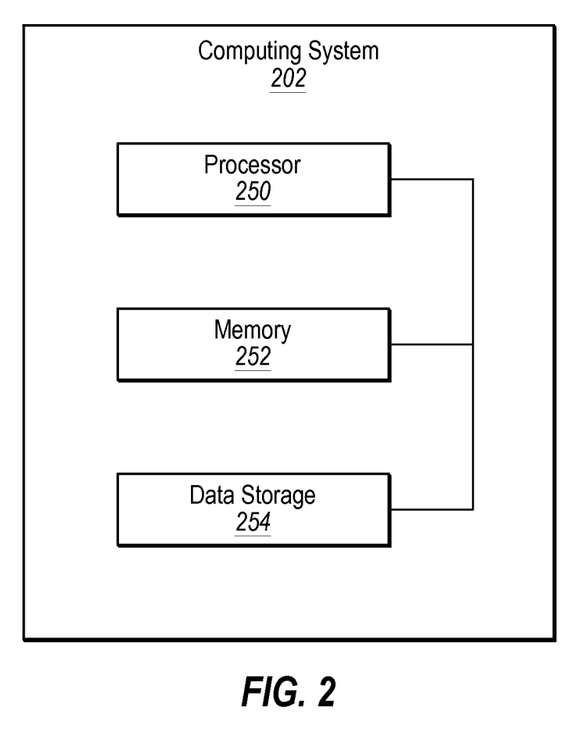
FIG. 2 illustrates a block diagram of an example computing system.

FIG. 2 illustrates a block diagram of an example computing system 202, according to at least one embodiment of the present disclosure. The computing system 202 may include an example of the computing system 102 of FIG. 1. The computing system 202 may include a processor 250, a memory 252, and a data storage 254. The processor 250, the memory 252, and the data storage 254 may be communicatively coupled.

In general, the processor 250 may include any suitable special-purpose or general-purpose computer, computing entity, or processing device including various computer hardware or software modules and may be configured to execute instructions stored on any applicable computer-readable storage media. For example, the processor 250 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, it is understood that the processor 250 may include any number of processors configured to perform, individually or collectively, any number of operations described herein such as the operations described with respect to the computing system 102 of FIG. 1. Additionally, one or more of the processors may be present on one or more different electronic devices, such as different servers.

In some embodiments, the processor 250 may interpret and/or execute program instructions and/or process data stored in the memory 252, the data storage 254, or the memory 252 and the data storage 254. In some embodiments, the processor 250 may fetch program instructions from the data storage 254 and load the program instructions in the memory 252. After the program instructions are loaded into memory 252, the processor 250 may execute the program instructions.

The memory 252 and the data storage 254 may include computer-readable storage media for carrying or having computer-executable instructions or data structures stored thereon. Such computer-readable storage media may include any available media that may be accessed by a general-purpose or special-purpose computer, such as the processor 250. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media.

Modifications, additions, or omissions may be made to the computing system 202 without departing from the scope of the present disclosure. For example, in some embodiments, the computing system 202 may include any number of other components that may not be explicitly illustrated or described.

Figure 3:
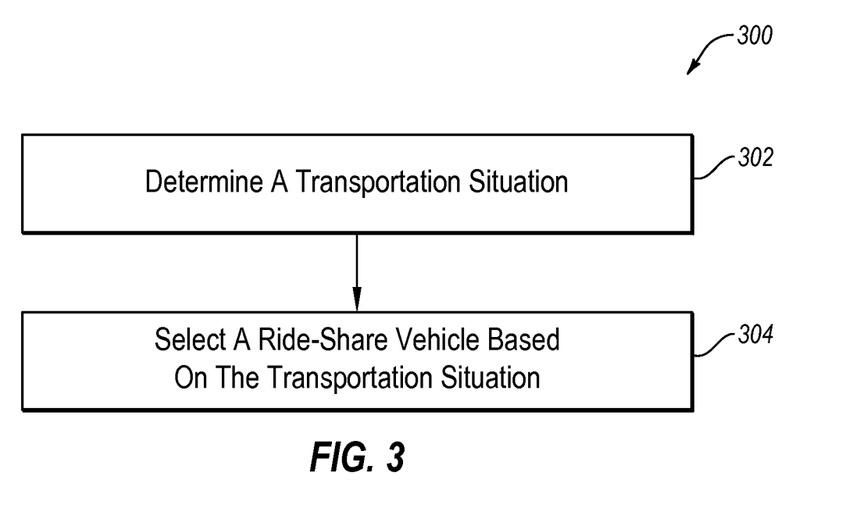
FIG. 3 is a flowchart of an example method to determine a ride-share vehicle.

FIG. 3 is a flowchart of an example method 300 to select a ride-share vehicle, according to at least one embodiment described herein. The method 300 may be implemented, in some embodiments, by a system, such as the ride-share system 100 of FIG. 1. Although illustrated as discrete blocks, various blocks may be divided into additional blocks, combined into fewer blocks, or eliminated, depending on the desired implementation.

The method 300 may begin, and at block 302 a transportation situation of a person may be determined. In some embodiments the transportation situation may be determined based on one or more factors selected from a group of factors such as, for example, weather, an itinerary, a planned destination, a planned event, a number of occupants, a cargo type, a cargo amount, a preference of the person, and a planned area of travel.

At block 304, a particular ride-share vehicle may be selected from multiple ride-share vehicles. The particular ride-share vehicle may be selected for use by the person with respect to the transportation situation and may be selected based on the transportation situation. Moreover, the particular ride-share vehicle may be of a particular vehicle type based on the transportation situation. In some embodiments, the particular ride-share vehicle may include a self-driving vehicle that may be configured to drive itself to a location of the person.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For instance, the method 300 may further include dispatching the particular ride-share vehicle to the location of the person. In these or other embodiments, the location of the person may be determined based on one or more location determination factors selected from a group of location determination factors that includes: location data of a user device associated with the person, an itinerary of the person, a calendar of the person, a reservation of the person, and a ticket purchase of the person.

In addition, in some embodiments, the method 300 may include determining an inventory of the ride-share vehicles for an area. Additionally or alternatively, the inventory may be determined based on one or more factors selected from a group of factors that includes: climate of the area, commonly used vehicles in the area, terrain of the area, vehicle usage patterns of persons who use the plurality of ride-share vehicles, typical road conditions in the area, common road size in the area, common road type in the area, parking situations of the area, and demand potential of the area. In these or other embodiments, the inventory may be modified based on usage patterns of the ride-share vehicles.

Further, in some embodiments, the method 300 may include determining another transportation situation of the person. Additionally or alternatively, the method 300 may include selecting another particular ride-share vehicle from the plurality of ride-share vehicles for use by the person with respect to the other transportation situation based on the other transportation situation. The particular ride-share vehicle may be of another particular vehicle type and may be based on the other transportation situation.

Figure 4:
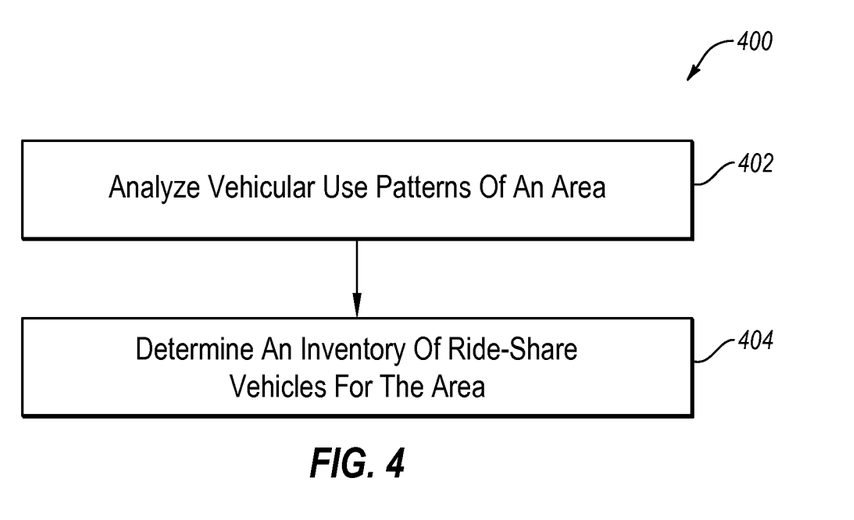
FIG. 4 is a flowchart of an example method to determine an inventory of ride-share vehicles.

FIG. 4 is a flowchart of an example method 400 to determine an inventory or ride-share vehicles, according to at least one embodiment described herein. The method 400 may be implemented, in some embodiments, by a system, such as the system 100 of FIG. 1. Although illustrated as discrete blocks, various blocks may be divided into additional blocks, combined into fewer blocks, or eliminated, depending on the desired implementation.

The method 400 may begin, and at block 402, vehicular use patterns of an area may be determined. In some embodiments, the vehicular use patterns may include climate of the area, commonly used vehicles in the area, terrain of the area, vehicle usage patterns of persons who use the plurality of ride-share vehicles, typical road conditions in the area, common road size in the area, common road type in the area, parking situations of the area, and demand potential of the area.

At block 404, an inventory of multiple ride-share vehicles may be determined for the area based on the vehicular use patterns.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. For instance, the method 400 may further include one or more operations of the method 300.

As indicated above, the embodiments described herein may include the use of a special purpose or general purpose computer (e.g., the processor 250 of FIG. 2) including various computer hardware or software modules, as discussed in greater detail below. Further, as indicated above, embodiments described herein may be implemented using computer-readable media (e.g., the memory 252 of FIG. 2) for carrying or having computer-executable instructions or data structures stored thereon.

In some embodiments, the different components, modules, engines, and services described herein may be implemented as objects or processes that execute on a computing system (e.g., as separate threads). While some of the system and methods described herein are generally described as being implemented in software (stored on and/or executed by general purpose hardware), specific hardware implementations or a combination of software and specific hardware implementations are also possible and contemplated.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A system comprising:
an inventory of vehicles that includes two or more vehicles of different makes and models, the inventory of vehicles including at least one self-driving vehicle configured to drive itself to a first location; and
a computing system configured to perform operations that comprise:
receiving, from a database linked to a user device associated with a user, a travel itinerary of the user that indicates a date and time of travel, a destination, personal preferences, or a combination thereof, wherein the receiving from the database is separate from manual input by the user at the time of the receiving from the database;
determining parking conditions of the destination at the date and time of travel;
automatically selecting a first vehicle from the inventory of vehicles for the user based on the travel itinerary and the parking conditions, the first vehicle further selected based on determining a vehicle make and model suited for the user based on the travel itinerary and the parking conditions;
determining a presence of the user device associated with the user at a departure location at the date and time of travel; and
automatically dispatching, the first vehicle, the first vehicle driving itself without human operation to the departure location, wherein upon arriving at the first location, the user takes control of the first vehicle.

2. The system of claim 1, wherein the operations further comprise:
obtaining a second travel itinerary of the user at a second time and at a second location, the obtaining including determining one or more factors selected from a group of factors, the group of factors including weather, an itinerary, a planned destination, a planned event, a number of occupants, a cargo type, a cargo amount, a preference of the user, a planned area of travel, gas prices, traffic patterns, road types, and road conditions.

3. The system of claim 1, wherein the operations further comprise:
determining the inventory of vehicles based on one or more factors selected from a group of factors that includes:
climate of the first location, commonly used makes and models of vehicles at the departure location, terrain of the departure location, vehicle usage patterns of persons who use vehicles from the inventory of vehicles, typical road conditions at the first location, common road size at the departure location, common road type at the departure location, parking situations at the departure location, and demand potential at the departure location.

4. The system of claim 1, wherein the operations further comprise modifying the inventory of vehicles based on usage patterns of the inventory of vehicles.

5. The system of claim 1, wherein the operations further comprise:
obtaining a second travel itinerary of the user at a second time and at a second location;
automatically selecting a second vehicle from the inventory of vehicles based on the second travel itinerary, the second vehicle being a different vehicle make and model than the first vehicle and selected based on determining the second vehicle is better suited for the second travel itinerary; and
dispatching the second vehicle, the second vehicle driving itself without human operation, wherein upon arriving at the second location, the user takes control of the second vehicle.

6. The system of claim 1, wherein the parking conditions include parking situations.

7. A method, comprising:
obtaining an inventory of vehicles that includes two or more vehicles of different vehicle makes and models, the inventory of vehicles including at least one self-driving vehicle configured to drive itself to a first location;
receiving, from a database linked to a user device associated with a user, a travel itinerary of the user that indicates a date and time of travel, a destination, personal preferences, or a combination thereof, wherein the receiving from the database is separate from manual input by the user at the time of the receiving from the database;
determining parking conditions of the destination at the date and time of travel;
automatically selecting a first vehicle from the inventory of vehicles for the user based on the travel itinerary and the parking conditions, the first vehicle further selected based on determining a vehicle make and model suited for the user based on the travel itinerary and the parking conditions;
determining a presence of the user device associated with the user at a departure location at the date and time of travel; and
automatically dispatching, the first vehicle, the first vehicle driving itself without human operation to the departure location, wherein upon arriving at the first location, the user takes control of the first vehicle.

8. The method of claim 7, wherein obtaining the inventory of vehicles further comprises:
determining the inventory of vehicles based on one or more factors selected from a group of factors that includes: climate of the departure location, commonly used vehicles at the departure location, terrain of the first location, vehicle usage patterns of users who use vehicles from the inventory of vehicles, typical road conditions at the departure location, common road size at the departure location, common road type at the departure location, parking situations at the departure location, and demand potential at the departure location.

9. The method of claim 7, further comprising modifying the inventory of vehicles based on usage patterns of the inventory of vehicles.

10. The method of claim 7, further comprising:
obtaining a second itinerary of the user at a second time and at a second location;
automatically selecting a second vehicle from the inventory of vehicles based on the second itinerary, the second vehicle being a different vehicle make and model than the first vehicle and selected based on determining the second vehicle is better suited for a second travel itinerary; and
dispatching the second vehicle, the second vehicle driving itself without human operation, wherein upon arriving at the second location, the user takes control of the second vehicle.

11. The method of claim 7, wherein obtaining the travel itinerary of the user further comprises:
   determining a reservation of the user, a ticket purchase by the user, a date of travel, the destination, a destination type, a travel duration to the destination; and
   a personal vehicle make and model preference, activities conducted at the destination or a combination thereof.

12. The method of claim 7, wherein the parking conditions include parking situations.

13. A system comprising:
   one or more processors; and
   computer-readable storage media configured to store instructions that, in response to being executed by the one or more processors, cause the system to perform operations, the operations comprising:
      analyzing vehicular use patterns of a geographic area, wherein vehicular use patterns are based on determining use patterns of different makes and models of vehicles;
      determining an inventory of vehicles for the geographic area based on the vehicular use patterns, wherein the inventory of vehicles comprises a plurality of different makes and models of vehicles based on the vehicular use patterns;
      receiving, from a database linked to a user device associated with a user, a travel itinerary of the user that indicates a date and time of travel, a destination, personal preferences, or a combination thereof, wherein the receiving from the database is separate from manual input by the user at the time of the receiving from the database;
      determining parking conditions of the destination at the date and time of travel;
      automatically selecting a first vehicle from the inventory of vehicles for the user based on the travel itinerary and the parking conditions, the first vehicle further selected based on determining a vehicle make and model suited for the user based on the travel itinerary and the parking conditions;
      determining a presence of a user device associated with the user at a departure location at the date and time of travel; and
      automatically dispatching, the first vehicle, the first vehicle driving itself without human operation to the departure location, wherein upon arriving at the departure location, the user takes control of the first vehicle.

14. The system of claim 13, wherein the vehicular use patterns include four or more factors selected from a group of factors that includes: climate of the geographic area, commonly used vehicles in the geographic area, terrain of the geographic area, vehicle usage patterns of users who use the vehicles, typical road conditions in the geographic area, common road size in the geographic area, common road type in the geographic area, parking situations of the geographic area, and demand potential of the geographic area.

15. The system of claim 13, wherein obtaining the travel itinerary of the user further comprises:
   determining a reservation of the user, a ticket purchase by the user, a date of travel, the destination, a destination type, a travel duration to the destination; and
   a personal vehicle make and model preference, activities conducted at the destination or a combination thereof.

16. The system of claim 13, wherein the operations further comprise obtaining a second travel itinerary of the user at a second time and at a second location, the obtaining including determining one or more factors selected from a group of factors, the group of factors including weather, an itinerary, a planned destination, a planned event, a number of occupants, a cargo type, a cargo amount, a preference of the user, a planned area of travel, gas prices, traffic patterns, road types, and road conditions.

17. The system of claim 16, wherein the operations further comprise:
   automatically selecting a second vehicle from the inventory of vehicles based on the second travel itinerary, the second vehicle being a different vehicle make and model than the first vehicle and selected based on determining the second vehicle is better suited for the second travel itinerary; and
   dispatching the second vehicle, the second vehicle driving itself without human operation, wherein upon arriving at the second location, the user takes control of the second vehicle.

18. The system of claim 13, wherein obtaining the inventory of vehicles further comprises determining the inventory of vehicles based on one or more factors selected from a group of factors that includes: climate of the departure location, commonly used vehicles at the departure location, vehicle usage patterns of users who use vehicles from the inventory of vehicles, typical road conditions at the departure location, common road size at the departure location, common road type at the departure location, parking situations at the departure location, and demand potential at the departure location.

19. The system of claim 13, wherein the operations further comprise modifying the inventory of vehicles based on usage patterns of the inventory of vehicles.

20. The system of claim 13, wherein the parking conditions include parking situations.

* * * * *